LOAD WEIGHING DEVICE

Original Filed March 23, 1953 2 Sheets-Sheet 1

INVENTOR.
Murrel C. Maugh
BY Oliver D. Olson
HIS AGENT

LOAD WEIGHING DEVICE

Original Filed March 23, 1953 2 Sheets-Sheet 2

INVENTOR.
Murrel C. Maugh
BY Oliver D. Olson
HIS AGENT

United States Patent Office

Re. 24,200

Reissued Aug. 21, 1956

24,200

LOAD WEIGHING DEVICE

Murrel C. Maugh, Eugene, Oreg.

Original No. 2,704,661, dated March 22, 1955, Serial No. 343,875, March 23, 1953, which is a continuation of application Serial No. 220,629, April 12, 1951. Application for reissue September 20, 1955, Serial No. 535,542

7 Claims. (Cl. 265—40)

Matter enclosed in heavy brackets [ ] appears in the original patent but forms no part of this reissue specification; matter printed in italics indicates the additions made by reissue.

This invention pertains to weight measuring scales, and relates particularly to the novel and extremely simplified construction of a scale adapted to weigh loads by measuring variations in pressure of a confined fluid.

This is a continuation[-in-part] of my abandoned application, Serial No. 220,629 filed April 12, 1951, and entitled "Load Weighing Device."

There are two well-known basic forms of scales of the fluid pressure type, in both of which a confined fluid is subjected to the external pressure of an article to be weighed and the resulting increase in pressure of the fluid is measured by a fluid pressure-responsive gauge. One of such forms of scales, many modifications of which have been proposed, comprises a housing which defines an enclosed fluid-filled chamber. The chamber communicates with a fluid pressure-responsive gauge. The face of the housing upon which an external load to be weighed is impressed comprises a thin flexible plate or diaphragm which yields readily under the weight of the load, and this diaphragm is backed by a movable weigh plate of substantial strength.

The second form of well-known scale, of which there are also many modifications, comprises a hollow cylinder in which a piston is contained. The piston is either freely movable in the cylinder or its movement is restricted somewhat by attachment to a flexible diaphragm fluid seal or by other means. In any case the piston and cylinder form an enclosed chamber in which fluid is contained, and a fluid pressure-responsive gauge communicates with the chamber.

Scales of the aforementioned diaphragm and piston types have structural limitations which represent decided disadvantages in certain fields of application. For example, the use of these types of scales on load hauling vehicles, such as a logging truck and trailer, require a construction of the vehicle itself to accommodate removal of the load from the scales at all times except when measuring the load weight. This construction is usually achieved by providing hydraulic jacks on the scales to elevate the load-bearing portion of the vehicle from its underlying support for purposes of weighing, the said parts of the vehicle being returned together after the weighing operation is completed. In this construction, locking means have to be provided to interconnect the relatively movable parts of the vehicle after weighing, and these locking means provide sufficient friction to result in erroneous indications of load weight.

The diaphragm and piston type scales cannot satisfactorily be installed upon load carrying vehicles in such manner as to carry the load at all times because the continuous and excessive vertical oscillation of the load as the vehicle travels over the roads will impress forces upon the diaphragm type of scale sufficient to rupture the diaphragm adjacent its weigh plate and will cause excessive and premature wear of the moving parts of the piston type scale. Furthermore these types of scales cannot stand the racking strains produced as the logs are rolled off the truck during the unloading thereof.

In both the aforementioned diaphragm and piston type scales, the fluid employed is substantially incompressible and the pressure gauge is of the type which accommodates an increase in the pressure of the fluid equivalent to the maximum load capable of being measured on the scale. This requirement of the gauge is necessary because neither the diaphragm nor the piston is adapted to support the load being weighed and therefore the loads are supported through the confined fluid by the structural resistance of the pressure gauge. These types of scales both utilize the principle of operation wherein a load is applied to the scale diaphragm or piston to cause a substantially equivalent increase in the pressure of the confined fluid, the said increase in fluid pressure thereby actuating the gauge to move a pointer to a dial reading which indicates the weight of the load.

In contrast, there is a third type of weighing scale which comprises a housing defining an enclosed fluid-filled chamber which communicates with an expandable, low pressure type of fluid pressure gauge[, as described hereinafter]. The housing includes a plate upon which is placed the load to be weighed. This plate is flexible, but yet strong enough to support the entire weight of loads within the limit of elastic resistance of the plate. The fluid pressure gauge required for this scale is of a type which is actuated over its operating range by a fluid pressure differential which is equivalent to but a small proportion of the weight applied to the scale plate. Thus, when a load is placed on the plate the latter deflects a proportionate distance into the fluid-filled chamber of the scale and thereby reduces the volume of said chamber by the amount proportionate to the weight of the load. A proportionate amount of fluid, equal to the decrease in volume of the chamber, is thereby displaced into the pressure gauge. The pressure gauge thereupon expands, under the influence of the small pressure exerted by the fluid, to take up the displaced fluid and also cause a pointer to be moved along a calibrated dial a proportionate distance to indicate the weight of the load.

In this third type of scale the fluid pressure required to actuate the gauge is so small, compared with the weight of the load, that the resistive influence of the gauge in supporting the load through the fluid is negligible. For all practical purposes, therefore, the load is supported entirely by the elastic resistance of the load-weighing scale plate, and the weight of the load causes a deflection of said plate. The measurement of fluid thus displaced is merely an alternative for physically measuring the deflection of the plate by such means as a micrometer.

The principal disadvantage of this third type of scale when installed upon a load carrying vehicle resides in the fact that the load-supporting plate of the scale becomes permanently stretched or deformed when subjected to the continual jolting forces exerted by the load during motion of the vehicle. Continual readjustment of the gauge pointer to zero reading and frequent recalibration of the gauge dial is required.

It is the principal object of the present invention to provide a weighing scale which operates on the principle of the diaphragm and piston type scales and yet has no relatively moving parts subject to wear and which has no thin diaphragm subject to stretching or rupture.

Another important object of this invention is to provide a fluid pressure scale for load-hauling vehicles which scale is of such extremely rugged construction that it may be installed as an integral part of the vehicle as the sole interconnecting means between upper and lower parts of the vehicle.

A further important object of this invention is the provision of a fluid pressure scale a plurality of which are capable of being connected together in fluid cooperative arrangement through a single pressure gauge to measure total load, irrespective of substantial degrees of loading unbalance.

A still further important object of this invention is the provision of a fluid pressure scale of extremely simplified construction, the body thereof being a unitary structure having no relatively movable parts, whereby to afford long life and efficient operation with a minimum of maintenance.

These and other objects and advantages of the present invention will appear through the following detailed description taken in connection with the accompanying drawings, in which.

Stated broadly, the scale of the present invention utilizes a hollow unitary structural body which defines an enclosed chamber, the chamber being connected to a fluid pressure gauge which is characterized by being operable throughout its range with [only an extremely small change in volume of its fluid-confining space] *a quantitative change in its fluid-confining volume which does not exceed the increase in volume of the scale chamber attending the initial prepressurization of the fluid which fills the scale system,* and is capable of accepting fluid pressures corresponding to the maximum weight capable of being measured by the scale. The chamber and pressure gauge is then filled with a substantially incompressible fluid[, whereby the scale functions to measure a load by the resistance of the entire scale body to outward deformation] *at a pressure sufficient to provide substantially maximum fluid pressure increase for a load applied to the load-receiving plate of the scale.*

The construction and operation of the scale of the present invention is described hereinafter with reference to its use on a logging trailer. Such reference is to be considered merely illustrative, however, for it will be apparent that the scale may be employed in various ways.

Figure 1:
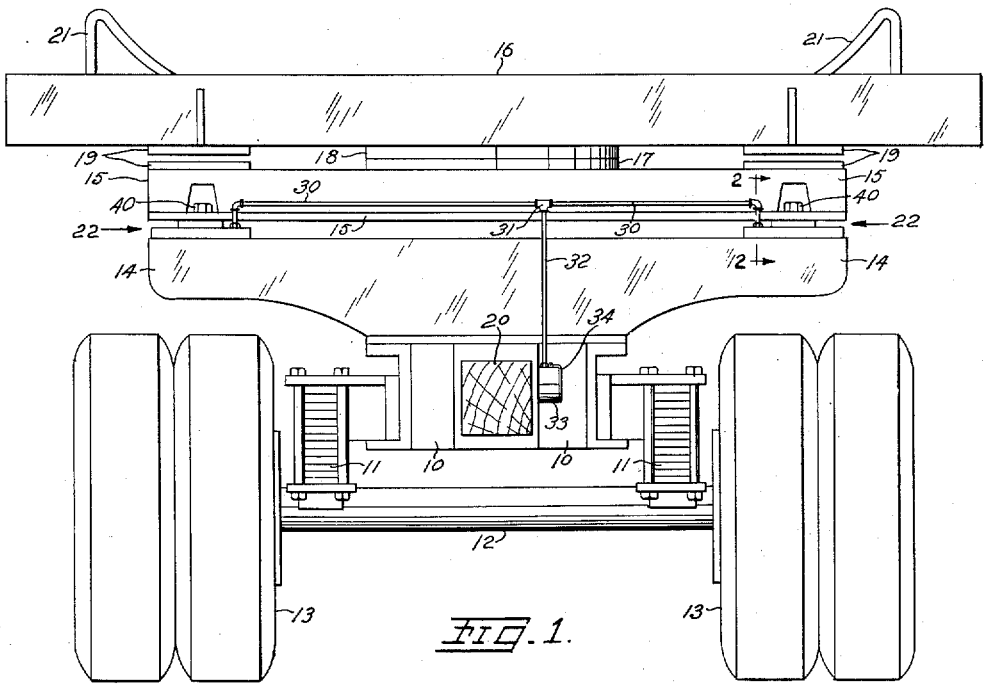
Figure 1 is an end view of a logging trailer showing mounted thereon a cooperating pair of scales embodying the features of this invention.

Referring to the drawings, there is shown in Figure 1 a conventional logging trailer comprising the main structural frame 10 mounted resiliently by springs 11 upon a pair of axles 12 which are supported by wheels 13. A transverse frame 14 is secured upon the main frame 10 and functions as a support for the fixed bunk 15 which is mounted thereon in the manner described in detail hereinafter.

A swinging bunk 16 is mounted rotatably upon the fixed bunk by the cooperating pivot discs 17, 18. These discs are secured to the fixed bunk and swinging bunk, respectively, and are maintained in proper superimposed alignment by a king bolt (not shown) which extends tthrough the center of said discs and is secured to the said bunks. Rub pads 19 are secured to the fixed and swinging bunks adjacent their respective ends to form spaced pairs which limit the degree of lateral tipping of the swinging bunk with respect to the fixed bunk.

The trailer assembly just described is connected to a truck or tractor by means of the reach 20. Logs may then be supported between the swinging bunks of the trailer and tractor and secured within the confines of the laterally spaced chocks 21. The foregoing arrangement is of conventional construction well-known to those skilled in the art and does not form a part of the present invention.

Figure 2:
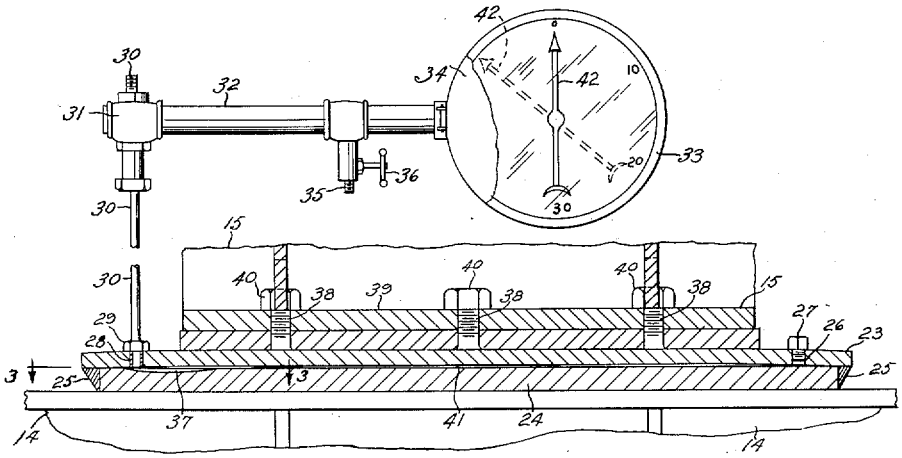
Figure 2 is an enlarged fragmentary sectional view taken along the line 2—2 in Figure 1 to show the detailed construction of the scale, the latter being shown in association with a gauge.

The fixed bunk 15 is mounted upon the transverse frame 14 in spaced relation with the latter by means of a pair of scales designated generally in Figure 1 by numeral 22. Referring now to Figure 2 of the drawing, the scale 22 is constructed of a pair of superimposed plates 23 and 24, which are characterized by being relatively inflexible. In the construction illustrated the upper plate 23 is shown to be of slightly larger length and width than the lower plate. The plates are secured together by a weld 25 deposited in contact with the peripheral edge of the lower plate and the overhanging portion of the upper plate. The plates may be secured together in various other ways well-known in the art.

A threaded outlet opening 26 is provided in plate 23 and is sealed releasably by the threaded plug 27. A threaded inlet opening 28 is also provided in plate 23 to receive the threaded coupling 29. A fluid conduit 30 is attached at one end to coupling 29 and at its opposite end to a second coupling 31. A conduit 32 connects the coupling 31 to a fluid pressure-responsive gauge 33.

[As explained hereinbefore, the pressure gauge 33 is of the type whose fluid-confining space is substantially non-expandable over its operating range, as distinguished from the type which accommodates considerable expansion at low pressures. Illustrative of the former type of pressure gauge is that which employs a curved metal Bourdon tube to actuate a pointer. In this type the curved Bourdon tube receives a fluid and tends to straighten out as its oval cross section assumes more circular form under the influence of increased internal fluid pressure, but this change in dimension is so small that the volume of the tube is increased only slightly, e. g. only a few thousandths of a cubic inch. For all practical purposes, therefore, this type of pressure gauge is considered to have a fluid-confining space which remains substantially constant throughout the operating range of the gauge, and it is so defined in the appended claims. The pressure gauge of the expandable type is illustrated by that which utilizes a bellows on the end of a Bourdon tube, or a movable piston, either of which actuates a pointer. In this type of pressure gauge the bellows or piston is actuated by small fluid pressures to expand their fluid-confining spaces to considerable extents, for example, more than one cubic inch.]

For use as a logging trailer scale, the gauge 33 is preferably provided with an end cover plate 34 by which to protect the gauge dial against damage from flying particles.

Connected to conduit 32 is a filler line 35 which is open at one end and provided with a shut-off valve 36. This line is employed to fill the scale system with fluid, as described in detail hereinafter.

Figure 3:
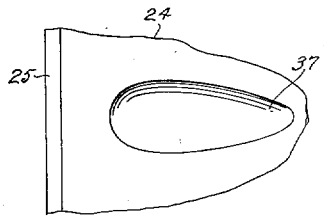
Figure 3 is a fragmentary plan view taken along the line 3—3 in Figure 2.

In the construction illustrated in Figures 1 and 2 it is to be observed that the plates 23 and 34 are secured together in closely abutting relationship. Accordingly, in order to facilitate the entrance of fluid into this space between the plates, the plate 24 is preferably provided with a shallow groove 37 arranged to communicate with the inlet opening 28, as shown in Figures 2 and 3.

Referring now to Figure 1 of the drawings, each of the scales 22 is disposed adjacent the opposite end of the transverse frame 14. Plate 24 of each scale is secured firmly to the frame 14, as by welding or other conventional means. A plurality of spaced upstanding stud bolts 38 are secured, as by welding, to the upper plate 23 along the longitudinal center line of the latter. A pressure plate 39, having transverse holes arranged to receive the stud bolts therethrough, is secured, as by welding, to each of the opposite ends of the fixed bunk 15 in proper relation with its cooperating scale. Complementary holes are also provided in the bottom plate of bunk 15 to receive the stud bolts 38, as best shown in Figure 2. A nut 40 is then secured to each bolt to fasten the bunk 15 and plate 39 securely to the scale plate 23. The fixed bunk is thus firmly secured to the transverse frame 14 by means of the scales 22.

The fluid conduit 30 extends from each scale 22 to the coupling 31. Conduit 32 extends from coupling 31 to the gauge 33 mounted conveniently upon the main frame 10, as shown, or at any other position desired.

Having now installed the scales in the manner described, it is necessary to fill the chamber and fluid lines and pressure gauge with fluid as completely as is practicable. The fluid must be substantially incompressible, it being preferred to use oil. One method of filling the system with fluid involves the evacuation of air from the system and utilizing the vacuum to draw oil into said system. In many instances the lack of proper equipment for evacuating the system necessitates an alternative procedure such as the following: A fluid pump, for example of the hydraulic jack type, is attached to the open end of filler line 35. Valve 36 is then opened and outlet plug 27 removed. Hydraulic fluid is then pumped through the conduits 32 and 30 *into the gauge and* into the inlet opening 28 of each scale. The fluid passes into the shallow groove 37 and is thence forced into the space 41 between the plates 23 and 24. Sufficient fluid is pumped into the space to [remove all entrapped air] *fill the scale system,* as is indicated by an uninterrupted flow of fluid from the outlet opening 26. Plug 27 is then installed to seal the outlet opening.

With the scale [chamber] *system* now completely filled with fluid, the hydraulic pump is actuated further to place the confined fluid under pressure. The purpose of this additional pressure is to reduce the volume of air entrapped in the [gauge] *scale system* to such an extent that the gauge functions in substantially the same manner as though it were filled with *incompressible* fluid. The amount of this additional pressure is dependent in part upon the capacity of the [gauge,] *scale system and* the amount of entrapped air [, and the capacity of the scale].

In Figure 2 the pointer 42 of the gauge 33 is shown in dotted lines in rest position, that is, with no fluid pressure being exerted upon the gauge. As fluid is forced into space 41 against the resistance of plates 23 and 24, the pointer 42 rotates clock-wise from the said rest position. When sufficient fluid has been introduced into the scale system to effect proper reduction of the volume of air, valve 36 is closed to seal the entire fluid system and the pump is removed. The position of pointer 42 is then established as the zero reading of the gauge dial. This may be achieved, for example, by providing a gauge having an adjustable pointer or dial.

Referring to Figure 2 of the drawing, it is to be noted that plate 23 is slightly thinner than plate 24. This construction is preferred for the installation illustrated in Figure 1 to provide greater expansion of plate 23 and thereby maintain the base plate 24 secured in firm contact with frame 14. It is to be understood however that plates 23 and 24 may be of identical thickness or of proportions other than those illustrated. In any case, it is important that plates 23 and 24 be constructed of material having sufficient tensile strength that they may permit substantial pressurization of the fluid without rupture of the scale.

When a log load is placed upon the bunk 16 the plate 23 is subjected to a force which tends to move it toward plate 24. But the entire scale body resists outward expansion and therefore causes an increase in the pressure of the fluid confined in the scale chamber 41 and gauge 33. It will be recognized however, that the movement of plate 23 is *quite small* [infinitesimal in view of the fact that the pressure gauge required for the scale is of the type whose fluid-confining volume varies only to a slight extent over the operating range of the gauge and the resistance of the entire scale body to outward deformation functions to limit the movement of said plate]. This is evident from the fact that if the fluid confining volume of the gauge and the scale body were capable of expanding to any significant degree the thin film of fluid between the plates 23 and 24 in Figure 2 would be expressed therefrom *when* a load is applied and the scale would become inoperative when the plates made contact.

The following construction of a scale of the present invention is exemplary: Mild steel plates 23 and 24 having dimensions of 24" x 9" x ½" and 23" x 8" x ¾", respectively, are welded together in the manner described hereinbefore. A pair of these scales were mounted upon a logging trailer in the manner illustrated in Figure 1 of the drawing. Oil was then forced into the space 41 of each scale by means of a hydraulic pump to a pressure of about 200 pounds per square inch. The zero reading of the gauge dial was then brought into registry with the pointer 42. The maximum separation of the pre-expanded plates was approximately 0.014 inch.

Log loads varying in weight upwardly to 20 tons were measured with extreme accuracy. The center of gravity of various log loads were shifted laterally of the logging bunk without adversely affecting the accuracy of the scale. On the other hand, inaccurate load measurements were obtained when the [gauge] *scale system* contained considerable air and [the scale system] was subjected to no or to only small initial fluid pressures. Under this condition log loads which were balanced upon the logging truck registered certain weight indications decreased substantially when the log loads were shifted to unbalanced conditions.

[It is the structural resistance of the scale body to outward deformation and the construction of the gauge to operate with only a very small change in fluid-confining volume that permits the scale of the present invention to be constructed in the manner described hereinbefore, that is, with the top and bottom plates secured together in face-abutting relation. In this construction the only] *In the construction illustrated in Figure 2 of the drawings the most* practical procedure for introducing fluid into the system is by means of the hydraulic pump mentioned above. Accordingly, the injection of fluid into the scale system by this procedure automatically achieves the condition necessary for proper operation of this scale. That is to say, it is necessary to inject the fluid into the system under the substantial pressure in order to fill the space between the scale plates with a quantity of fluid, and thus any air which might be trapped in the [gauge] *scale system* is automatically reduced to a volume which presents no significant error in the operation of the gauge. Moreover, by the injection of fluid between the scale plates under substantial pressure, the load-receiving plate is pre-expanded outwardly to an extent which renders the scale operable to measure substantially greater loads than is possible when the fluid film between the scale plates is at atmospheric pressure.

*In addition, because of the fact that the load-receiving plate is expanded outwardly from its normal relaxed position, it is placed under tension which tends to return it to said relaxed condition. Thus, no portion of an external load being weighed is utilized to flex the plate inwardly from its expanded state to a condition of lesser tension when a load is applied thereto. Stated otherwise, in normal operation the load-receiving plate of the scale never moves to a state of greater tension when a load is applied thereto. Accordingly, the entire weight of the load functions to increase the internal pressure of the*

*fluid and to register an accurate response thereto on the gauge.*

*As stated hereinbefore, the initial pressure required for the scale system is dependent in part upon the fluid capacity of the scale system and the amount of entrapped air. In the foregoing exemplified construction initial pressures ranging between 50 p. s. i and 200 p. s. i. were found to be completely satisfactory.*

The construction of the scale shown in Figure 2, i. e. with the scale plates in substantially face-abutting relationship, offers the advantage of requiring a minimum of fluid in the scale body and thus reduces to a minimum the error of gauge readings due to temperature changes in the fluid.

Figure 4:
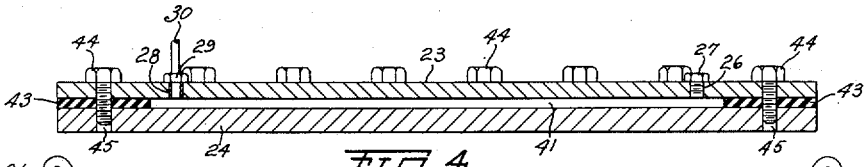
Figure 4 is a sectional view of a modified form of scale embodying the features of this invention.

The scale of the present invention may be constructed in various ways and in sizes and shapes designed to accommodate particular installations. In Figure 4 of the drawings the scale is shown to provide a larger chamber 41 by spacing the plates 23 and 24 apart. In the construction illustrated a spacer ring 43 is interposed between the plates adjacent the peripheries of the latter. A plurality of bolts 44 extends freely through holes in the top plate 23 and the spacer and are secured in the threaded holes *45* [44] provided in plate 24. The ring is shown in the drawings to be constructed of rubber, although it is understood that other materials such as metal may be employed with equal advantage since in any event the spacer is so firmly compressed and secured that it functions as a rigid member.

Figure 5:
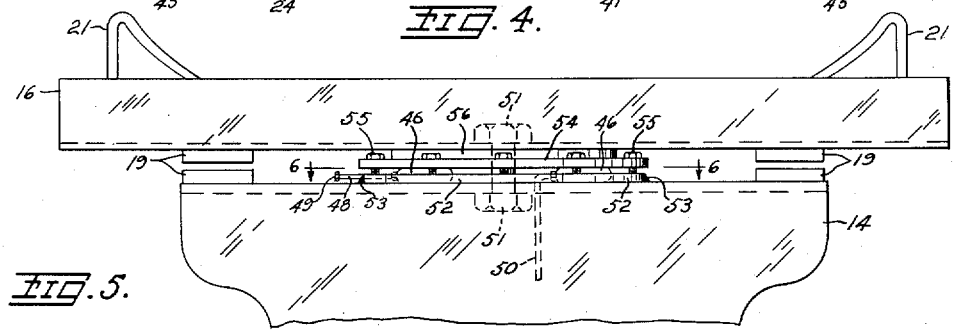
Figure 5 is a fragmentary end view of a logging trailer showing mounted thereon a further modified form of scale embodying the features of the present invention.
Figure 7:
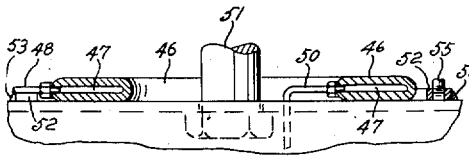
Figure 7 is a fragmentary sectional view taken along the line 7—7 in Figure 6.
Figure 6:
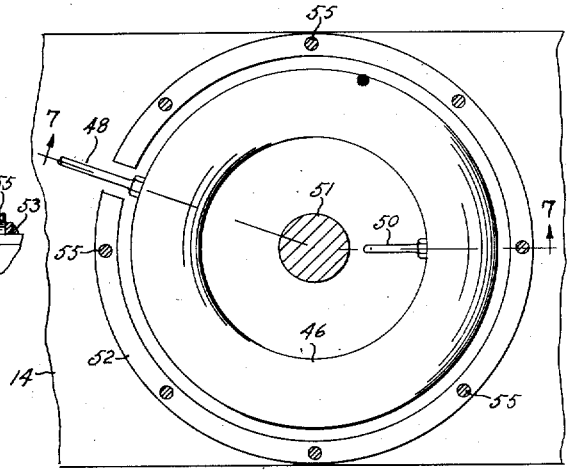
Figure 6 is a fragmentary plan view taken along the line 6—6 in Figure 5.

Figures 5, 6 and 7 illustrate a modified form of scale particularly adapted for installation at the pivotal center of a logging trailer. In this case the trailer comprises the transverse frame 14 and swinging bunk 16, the fixed bunk 15 previously described being omitted. The scale comprises a circular ring-shaped body 46 having an angular chamber 47 therein. The body may be formed of a tube bent to circular form and welded at the abutting ends, and then flattened to the shape illustrated in Figure 7. Alternatively, the body may be formed of superimposed ring-shaped discs welded together about their inner and outer peripheries. An outlet tube 48 communicates with the chamber 47 and is provided at its outer end with a removable cap 49. An inlet tube 50 also communicates with the chamber 47 and extends therefrom to the pressure-responsive gauge 33 described hereinbefore. The outlet and inlet tubes function in the manner of the outlet 26 and inlet 28 previously described.

The body 46 is disposed upon the frame 14 concentrically about the king bolt 51. A confining ring 52 is arranged in spaced relation about the body 46 and secured as by the weld 53, to the frame. In the construction illustrated the confining ring is slotted to permit passage of the outlet tube 48, therethrough. The ring is thinner in cross section than the body 46, as shown in Figures 5 and 7 for purposes described in detail hereinafter.

Pivot disc 54 is arranged upon the scale body 46 and is secured about its projecting edge to the ring 52 by means of the circumferentially spaced bolts 55. In this manner the pivot disc 54 is secured to frame 14. Pivot disc 56 is of smaller circumference than disc 54 and is secured to the swinging bunk 16 by welding or other conventional means. King bolt 51 functions to maintain the discs 54 and 56 in proper superimposed position, in manner well-known in the art.

After the scale body 46 has been installed in the manner described, oil or other incompressible fluid is introduced into the system, as by vacuum or pressure, as previously explained. A feeder line 35 and shut-off valve 36 as shown in Figure 2 is provided for this purpose.

Figure 8:
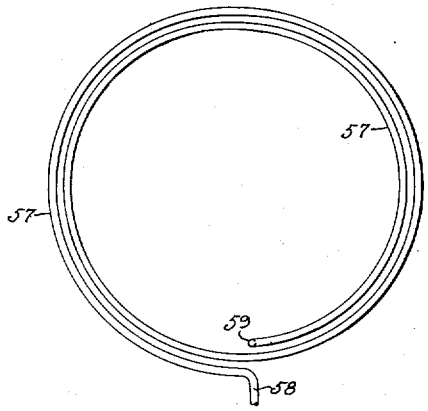
Figure 8 is a plan view of a still further modified form of scale embodying the features of this invention.

Figure 8 illustrates a modified construction of the scale adapted for similar use as the scales shown in Figures 5, 6 and 7. The scale is constructed of a length of metal tubing 57 which is coiled in spiral form and preferably flattened to oval cross section to provide a ring-shaped body. The outer end of the tubing forms the outlet tube 58 while the inner end forms the inlet tube 59. The structure may be installed on the logging trailer shown in Figure 5 in substantially the same manner as ring-shaped body 46, the outlet 58 and inlet 59 being arranged in the manner of the outlet 48 and inlet 50 formerly described. After installation the tube 57 and gauge 33 are filled with fluid as explained hereinbefore.

It is to be noted that each of the scale modifications described herein includes a unitary structural body defining an internal chamber filled with a substantially incompressible fluid. In each modification it is required that the entire structural body be made of material which is capable of resisting outward deformation when subjected to increased internal fluid pressure, as results with the application of a load to be weighed. This resistance to outward deformation must be of such a magnitude as to limit the inward deflection of the load-receiving plate to such an extent that the scale ceases to depend upon the deflection of said load-receiving plate in a direction perpendicular to the plate of said plate for measuring a load. This condition must prevail, with negligible expansion of the scale body, up to the maximum weight capable of being measured by the scale. In addition, the pressure gauge 33 must be constructed to operate over its range with a very small change in fluid-confining volume in order to limit the inward deflection of the load-receiving plate 23 to the same extent explained above, *i. e. the quantitative increase in the fluid confining volume of the gauge must not exceed the quantitative increase in volume of the scale chamber 41 which attends the initial prepressurization of the fluid.* These are [impotrant] *important* structural requirements for the present scale in order for the latter to operate under conditions of loading unbalance, either as a single scale or as a scale unit comprising a plurality of scales coupled together by common fluid passage to a single pressure gauge.

From the foregoing description it will be apparent that the present invention provides a scale which is of extremely rugged construction and yet is capable of measuring loads with maximum accuracy. The scale may be constructed to accommodate the measuring of various types of loads simply by the proper selection of materials and pressure gauge and the proper filling of the system with fluid. Diverse shapes and sizes may be provided to accommodate particular installations. For example, scales may be constructed for mounting between the main frame 10 and the connecting brackets of springs 11, or, if preferred, between the axle 12 and the springs 11. As a further example four scales may be positioned adjacent the corners of a large platform and coupled together through a single pressure gauge.

The novel scale construction affords for the first time the coupling together of a plurality of scale bodies to provide a scale unit which measures total load even under most adverse conditions of unbalance. The scale system requires a minimum of attention after proper installation because the fluid system is sealed and the absence of moving connections substantially eliminates the possibility of leakage and wear. For example, the foregoing scale system has been installed upon logging trucks and trailers and operated continuously and with sustained accuracy over 19 months without any attention whatsoever.

The scale is ideally adapted for use on logging trucks and other load carrying vehicles, particularly as an integral interconnecting part of said vehicles, for the scales are not subject to error due to the accumulation of dirt, road tars and other materials around the scales which ordinarily render scales of the diaphragm and piston type inoperable.

Various changes may be made in the structural details illustrated and described hereinbefore without departing from the scope and spirit of the present invention. For example, in the vehicle installation illustrated, the bottom plate 24 of the scale may also be provided with stud bolts for purposes of detachably connecting the bottom plate and the frame 14 together, in manner similar to the detachable connection provided between the top plate 23 and the fixed bunk 15. Also any type of metal or other material having the required strength characteristics described hereinbefore may be employed in the construction of the scale body. Further, the scale may be constructed in various sizes and ranges of weighing capacity, it being necessary, however, to provide the scale and gauge characteristics described hereinbefore. Accordingly, it is to be understood that the foregoing description is merely illustrative of the invention and is not to be considered in a limiting sense.

Having now described my invention in the manner in which the same may be used, what I claim as new and desire to secure by Letters Patent is:

1. A load weighing scale comprising a hollow unitary substantially rigid structural body defining a chamber therein, a fluid pressure-responsive gauge connected to the said body and communicating with the chamber, [the gauge being characterized by having a fluid-confining space which remains substantially constant throughout the operating range of the gauge,] and a substantially incompressible fluid filling substantially the entire chamber and gauge at a pressure sufficient to provide substantially maximum fluid pressure increase for a load applied to the scale.

2. A load weighing scale comprising a pair of substantially rigid structural plates arranged in spaced superimposed relationship and sealed rigidly together about their peripheries to form a hollow unitary structural body defining a chamber therein, a fluid pressure-responsive gauge connected to the said body and communicating with the chamber, [the gauge being characterized by having a fluid-confining space which remains substantially constant throughout the operating range of the gauge,] and a substantially incompressible fluid filling substantially the entire chamber and gauge at a pressure sufficient to provide substantially maximum fluid pressure increase for a load applied to the scale.

3. A load weighing scale comprising a pair of substantially rigid structural plates preliminarily arranged in face-abutting relationship and sealed rigidly together about their peripheries to form a unitary structural body, a fluid pressure-responsive gauge connected to the said body and communicating with the internal faces of said plates, [the gauge being characterized by having a fluid-confining space which remains substantially constant throughout the operating range of the gauge,] and a substantially incompressible fluid injected into the gauge and between the internal faces of said plates under pressure sufficient to expand the plates outwardly to form a fluid-filled chamber and sufficient to provide substantially maximum fluid pressure increase for a load applied to the scale.

4. A load weighing scale system comprising a plurality of scales each of which comprises a hollow unitary substantially rigid structural body defining a chamber therein, a fluid pressure-responsive gauge interconnecting the plurality of chambers for common fluid passage between said chambers and gauge, [the gauge being characterized by having a fluid-confining space which remains substantially constant throughout the operating range of the gauge,] and a substantially incompressible fluid filling substantially the entire plurality of chambers and gauge at a pressure sufficient to provide substantially maximum fluid pressure increase for a load applied to the scale system regardless of the degree of loading unbalance.

5. In combination with a load-carrying vehicle, a load weighing scale comprising a hollow unitary substantially rigid structural body defining a chamber therein and having top and bottom plate members, the body being positioned on the vehicle between upper and lower parts of the latter, means securing the upper plate member to the upper part of the vehicle and the lower plate member to the lower part of the vehicle, whereby said scale body functions to rigidly interconnect said upper and lower parts of the vehicle, a fluid pressure-responsive gauge connected to the said body and communicating with the chamber, [the gauge being characterized by having a fluid-confining space which remains substantially constant throughout the operating range of the gauge,] and a substantially incompressible fluid filling substantially the entire chamber and gauge at a pressure sufficient to provide substantially maximum fluid pressure increase for a load applied to the scale.

6. In combination with a load-carrying vehicle, a load weighing scale system comprising a plurality of scales each of which comprises a hollow unitary substantially rigid structural body defining a chamber therein and having top and bottom plate members, the plurality of scale bodies being mounted at spaced positions on the vehicle between upper and lower parts of the latter, means securing the upper plate member of each scale body to the upper part of the vehicle and the lower plate member of each scale body to the lower part of the vehicle, whereby said plurality of scale bodies functions to rigidly interconnect said upper and lower parts of the vehicle, a fluid pressure-responsive gauge interconnecting the plurality of chambers for common fluid passage between said chambers and gauge, [the gauge being characterized by having a fluid-confining space which remains substantially constant throughout the operating range of the gauge,] and a substantially incompressible fluid filling substantially the entire plurality of chambers and gauge at a pressure sufficient to provide substantially maximum fluid pressure increase for a load applied to the scale system regardless of the degree of loading unbalance.

7. A load weighing scale comprising a ring-shaped hollow unitary substantially rigid structural body defining an annular chamber therein, a fluid pressure-responsive gauge connected to the said body and communicating with the chamber, [the gauge being characterized by having a fluid-confining space which remains substantially constant throughout the operating range of the gauge,] and a substantially incompressible fluid filling substantially the entire chamber and gauge at a pressure sufficient to provide substantially maximum fluid pressure increase for a load applied to the scale.

References Cited in the file of this patent or the original patent

UNITED STATES PATENTS

| | | |
|---|---|---|
| 566,698 | Raab | Aug. 25, 1896 |
| 1,579,658 | Pugh | Apr. 6, 1926 |
| 1,661,241 | Trott | Mar. 6, 1928 |
| 2,109,460 | Brasher | Mar. 1, 1938 |
| 2,561,321 | Tate | July 17, 1951 |

FOREIGN PATENTS

| | | |
|---|---|---|
| 195,793 | Great Britain | Apr. 12, 1923 |